US010079373B2

(12) United States Patent
Kim et al.

(10) Patent No.: US 10,079,373 B2
(45) Date of Patent: Sep. 18, 2018

(54) POUCH TYPE SECONDARY BATTERY AND METHOD OF MANUFACTURING THE SAME

(71) Applicant: LG CHEM, LTD., Seoul (KR)

(72) Inventors: Jeoung Hwan Kim, Daejeon (KR); Shin Hwa Lee, Daejeon (KR); Woo Yong Lee, Daejeon (KR); Min Su Kim, Daejeon (KR); Hyang Mok Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 149 days.

(21) Appl. No.: 14/477,523

(22) Filed: Sep. 4, 2014

(65) Prior Publication Data

US 2014/0377641 A1    Dec. 25, 2014

Related U.S. Application Data

(63) Continuation of application No. PCT/KR2014/004493, filed on May 20, 2014.

(30) Foreign Application Priority Data

May 21, 2013    (KR) .................. 10-2013-0057390

(51) Int. Cl.
  *H01M 2/00*    (2006.01)
  *H01M 2/08*    (2006.01)
  (Continued)

(52) U.S. Cl.
  CPC .......... *H01M 2/08* (2013.01); *H01M 2/0217* (2013.01); *H01M 2/0292* (2013.01);
  (Continued)

(58) Field of Classification Search
  CPC . H01M 2/0217; H01M 2/0292; H01M 2/0287
  (Continued)

(56) References Cited

U.S. PATENT DOCUMENTS 6,503,656 B1    1/2003    Bannai et al.
2002/0164441 A1*    11/2002    Amine .................... B32B 15/08
                                                                    428/35.2

(Continued)

FOREIGN PATENT DOCUMENTS

CN    101312253 A    11/2008
CN    101983442 A    3/2011
  (Continued)

OTHER PUBLICATIONS

Machine translation of JP 2007265879 A, obtained Dec. 16, 2016.*
  (Continued)

*Primary Examiner* — Milton I Cano
*Assistant Examiner* — Abibatu O Ojo-Amoo
(74) *Attorney, Agent, or Firm* — Birch, Stewart, Kolasch & Birch, LLP (57) ABSTRACT

A pouch type secondary battery and a method of manufacturing the same are disclosed. The pouch type secondary battery includes a pouch type case formed by attaching an upper sheet and a lower sheet, and an electrode assembly received in the pouch type case. A polymer coating layer for improving sealability is further included at an outer side portion of the pouch type case, in which the upper sheet and the lower sheet are attached.

15 Claims, 5 Drawing Sheets

(51) Int. Cl.
*H01M 2/02* (2006.01)
*H01M 10/04* (2006.01)

(52) U.S. Cl.
CPC ...... *H01M 10/0436* (2013.01); *H01M 2/0287* (2013.01); *Y10T 29/4911* (2015.01)

(58) Field of Classification Search
USPC .......................................................... 429/185
See application file for complete search history.

(56) References Cited

U.S. PATENT DOCUMENTS

| | | |
|---|---|---|
| 2005/0014239 A1 | 1/2005 | Melis et al. |
| 2008/0292962 A1 | 11/2008 | Jung |
| 2011/0129728 A1 | 6/2011 | Kim et al. |
| 2011/0183189 A1 | 7/2011 | Kumar et al. |
| 2011/0200871 A1 | 8/2011 | Pytlik et al. |
| 2012/0077071 A1 | 3/2012 | Jung |
| 2012/0219847 A1 | 8/2012 | Hong et al. |
| 2013/0071696 A1* | 3/2013 | Kim .................. H01M 2/0275 429/7 |

FOREIGN PATENT DOCUMENTS

| | | |
|---|---|---|
| JP | 10-308240 A | 11/1998 |
| JP | 11-288737 A | 10/1999 |
| JP | 2000-251854 A | 9/2000 |
| JP | 2001-6633 A | 1/2001 |
| JP | 2002-56823 A | 2/2002 |
| JP | 2003-331819 A | 11/2003 |
| JP | 2004-79434 A | 3/2004 |
| JP | 2006-310039 A | 11/2006 |
| JP | 2007-265879 A | 10/2007 |
| JP | 2011-142092 A | 7/2011 |
| JP | 2012-212544 A | 11/2012 |
| KR | 10-0865399 B1 | 10/2008 |
| KR | 10-2009-0008086 A | 1/2009 |
| KR | 10-0956397 * | 5/2010 |
| KR | 10-2011-0044954 A | 5/2011 |
| KR | 10-2012-0097312 A | 9/2012 |
| KR | 10-2013-0013220 A | 2/2013 |
| KR | 10-2013-0044705 A | 5/2013 |
| TW | M415426 U1 | 11/2011 |

OTHER PUBLICATIONS

Extended European Search Report, dated Oct. 19, 2015, for European Application No. 14801445.9.
Hong et al., "Pouch-type secondary battery connected to battery module or battery pack used as power source of medium-to large-sized device, has insulating material . . . ," Database WPI, Thomson Scientific, Week 201356, Feb. 6, 2013, Abstract Only, XP-002745449, 2 pages.
Kim et al., "Manufacturing method of pouch type battery, involves applying UV-curable materials on end portion of perpendicularly bent sealing units," Database WPI, Thomson Scientific, Week 201164, May 3, 2011, Abstract Only, XP-002745450, 1 page.
International Search Report issued in PCT/KR2014/004493, dated Aug. 26, 2014.
Written Opinion of the International Searching Authority issued in PCT/KR2014/004493, dated Aug. 26, 2014.

* cited by examiner

POUCH TYPE SECONDARY BATTERY AND METHOD OF MANUFACTURING THE SAME

CROSS-REFERENCE TO RELATED APPLICATIONS

This application is a Continuation of PCT International Application No. PCT/KR2014/004493 filed on May 20, 2014, which claims priority under 35 U.S.C. § 119(a) to Patent Application No. 10-2013-0057390 filed in the Republic of Korea on May 21, 2013, all of which are hereby expressly incorporated by reference into the present application.

BACKGROUND OF THE INVENTION

Field of the Invention

The present invention relates to a pouch type secondary battery and a method of manufacturing the same.

Description of the Related Art

As the technical development and the demand on mobile devices increase, the demand on secondary batteries as energy sources rapidly increases. Thus, researches on batteries meeting diverse demands have been conducted substantially. Particularly, rechargeable secondary batteries receive attention as power sources of electric vehicles, hybrid electric vehicles, etc.

Secondary batteries may be manufactured in a variety of forms. Typically, demands on a prismatic type secondary battery and a pouch type secondary battery, having a thin thickness and applicable in products such as a cellular phone are high. When considering materials, demands on a lithium secondary battery such as a lithium cobalt polymer battery having good energy density, discharge voltage and safety are high.

Among the above-described batteries, the pouch type secondary battery is favorable for realizing the slimness and lightweight of portable electronic devices.

The pouch type secondary battery is manufactured by receiving an electrode assembly including a cathode, an anode and a separator in a pouch type case of an exterior material, performing a first formation of a battery, degassing using an extra part, cutting and removing the extra part, and performing a second formation of the battery.

In this case, the safety of the battery may be deteriorated due to the current flowing through an exposed metal layer of the pouch type case by the cutting, and water permeation and electrolyte loss may be generated by the loss of packaging capability due to corrosion. Particularly, side reactions in the battery due to water may be generated, and battery performance and safety may be deteriorated.

Therefore, a method of manufacturing a pouch type secondary battery that may improve the above-described defects is greatly required.

SUMMARY OF THE INVENTION

An aspect of the present invention provides a pouch type secondary battery including a polymer coating layer on the outer side portion of a pouch type case to improve sealability.

Another aspect of the present invention provides a method of manufacturing the pouch type secondary battery.

According to an aspect of the present invention, there is provided a pouch type secondary battery including a polymer coating layer on the outer side portion of a pouch type case to improve sealability.

Particularly, according to an aspect of the present invention, there is provided a pouch type secondary battery including a pouch type case formed by attaching an upper sheet and a lower sheet, and an electrode assembly received in the pouch type case, wherein a polymer coating layer for improving sealability is further included at an outer side portion of the pouch type case, in which the upper sheet and the lower sheet are attached.

The polymer may be a UV curable polymer or a thermosetting polymer.

According to another aspect of the present invention, there is provided a method of manufacturing a pouch type secondary battery including preparing a pouch type case provided with a receiving part for receiving an electrode assembly and a gas collecting part connected to the receiving part for collecting gas generated in the receiving part, receiving the electrode assembly in the pouch type case, sealing an outer part of the pouch type case by heat welding, injecting an electrolyte in the pouch type case, activating a secondary battery and collecting gas generated during activating through the gas collecting part, heat welding a boundary of the receiving part and the gas collecting part, cutting and removing the gas collecting part, and forming a polymer coating layer on an outer side portion of the pouch type case receiving the electrode assembly.

In this case, the polymer coating layer may be formed by a contact type coating method.

According to the present invention, a polymer coating layer for improving sealability is formed on the outer side portion of a pouch type case, and a pouch type secondary battery increasing the reliability on the prevention of water permeation and electrolyte leakage may be manufactured.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the inventive concept will be described below in more detail with reference to the accompanying drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The subject matters described in the embodiments and drawings in this specification are just preferred embodiments and are to be considered illustrative and not restrictive. Accordingly, all such equivalents and modifications are intended to be included within the scope of the present inventive concept.

First, a pouch type secondary battery including a pouch type case formed by attaching an upper sheet and a lower sheet; and an electrode assembly received in the pouch type case, wherein a polymer coating layer for improving sealability is additionally included on the outer side portion of the pouch type case, in which the upper sheet and the lower sheet are attached, is provided in the present invention.

Figure 1A:
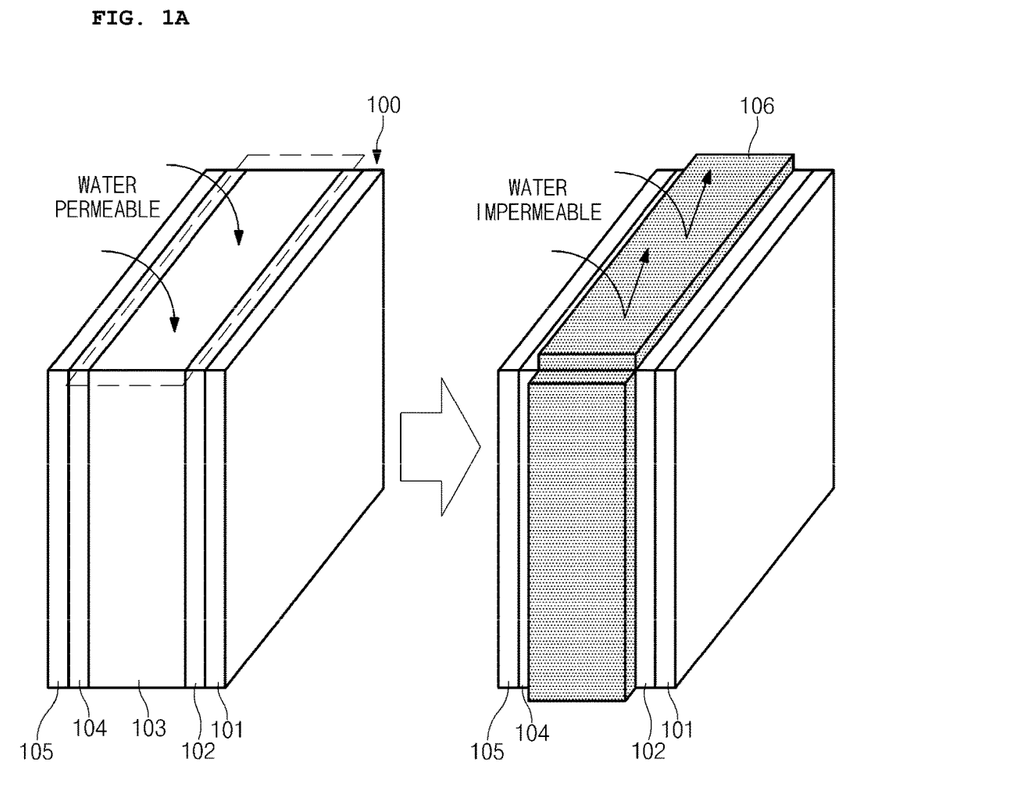
FIGS. 1A and 1B are schematic diagrams illustrating pouch type secondary batteries including a polymer coating layer according to an embodiment of the present invention.
Figure 1B:
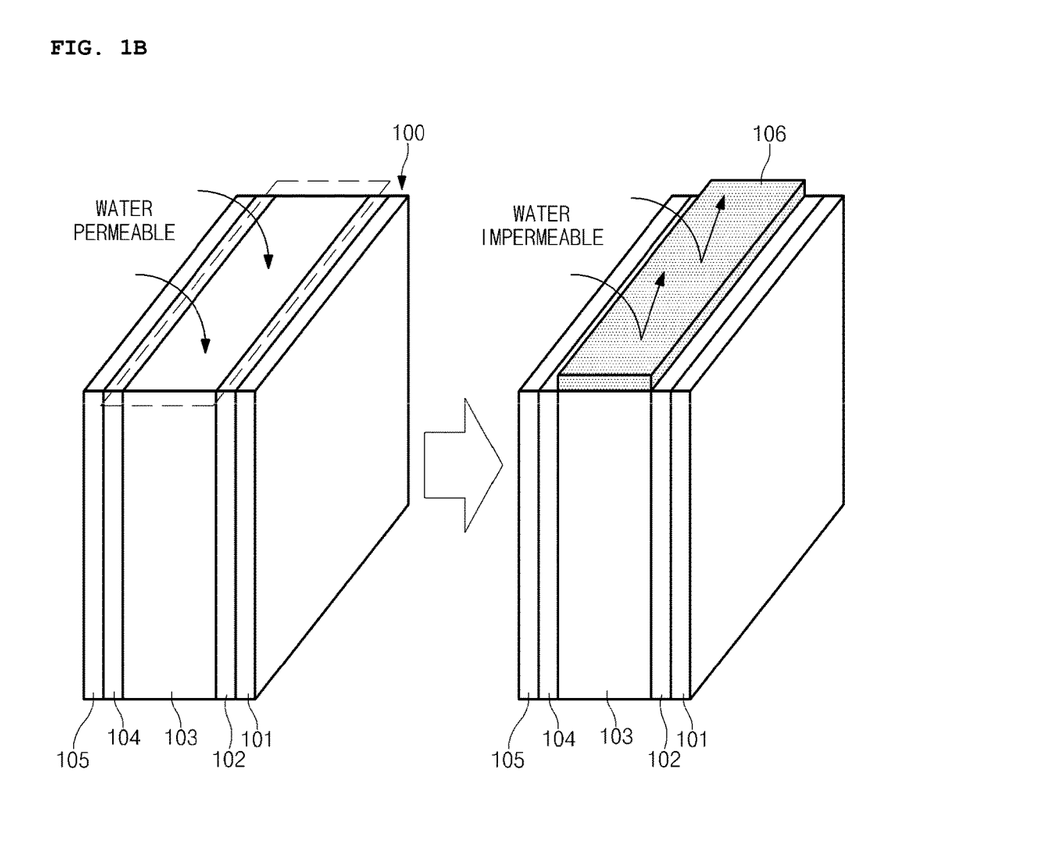

Particularly, FIGS. 1A and 1B are schematic diagrams illustrating pouch type secondary batteries including a polymer coating layer according to an embodiment of the present invention.

Referring to FIGS. 1A and 1B, the pouch type secondary battery includes an upper sheet and a lower sheet, and each of the upper sheet and the lower sheet includes an inner layer 101/an adhesive layer 102/a metal layer 103/a corrosion preventing layer 104/an outer layer 105, and the upper sheet and the lower sheet are welded by heat to each other.

The inner layer 101 has heat adhesive properties and plays the role of a sealing material, and may include at least one selected from the group consisting of a non-oriented polypropylene, a ternary copolymer of polypropylene-butylene-ethylene, polypropylene chloride, polyethylene, a copolymer of ethylenepropylene, a copolymer of polyethylene and acrylic acid, and a copolymer of polypropylene and acrylic acid.

The adhesive layer 102 is formed by coating an adhesive resin attachable to the metal layer 103 for the favorable attachment to the metal layer 103. The adhesive layer 102 is formed by using a similar material as the inner layer 101, and may include at least one selected from the group consisting of polyethylene terephthalate, acid modified polypropylene and acid modified polyethylene to improve the adhesiveness with the metal layer 103.

The metal layer 103 is provided to keep mechanical strength and plays a role as a barrier layer of humidity and oxygen. The metal layer 103 may include one or a mixture selected from the group consisting of iron (Fe), carbon (C), chromium (Cr), manganese (Mn), nickel (Ni) and aluminum (Al). More particularly, the metal layer 103 may include at least one selected from the group consisting of aluminum; an alloy of iron, carbon, chromium and manganese; and an alloy of iron, carbon, chromium and nickel.

The outer layer 105 acts as a base and a passivation layer and may include at least one selected from the group consisting of polyethylene, polyphenylene ether, polyimide, polypropylene, casted polypropylene, polyether terephthalate and polyphenylene sulfide. The corrosion preventing layer 104 may be additionally disposed between the outer layer 105 and the metal layer 103.

The corrosion preventing layer 104 is a layer having resistance to corrosion generated by an electrolyte and may include zirconium, chromium or a mixture thereof.

In addition, the electrode assembly is an electricity generating element in which a cathode and an anode are stacked in order with a separator disposed therebetween and has a stacked type or a stack and folding type structure. Electrode tabs are extended from each of electrode plates of the electrode assembly, and electrode terminals are electrically connected to each of a plurality of the electrode tabs extended from each of the electrode plates by, for example, welding. And a portion of the electrode terminals is exposed to exterior of the pouch type secondary battery for the electrical connection of a battery body with exterior.

Meanwhile, in the pouch type secondary battery, a first formation of a battery is performed, and a degassing process for removing gas generated during initial charging and discharging is performed. Then, a gas collecting part is cut and removed, and a second formation of the battery is performed. In this case, a metal layer configured to form a pouch type case is exposed by the cutting process and corroded to lose packaging capability. Thus, water permeation and electrolyte loss may be generated, thereby deteriorating the performance and safety of the battery.

To solve the above-described defects, in the present invention, a polymer coating layer 106 is additionally formed on the outer side portion of the pouch type case, in which the upper sheet and the lower sheet are attached, to improve sealability before or after performing the second formation process. Thus, the current flow of the metal layer forming the pouch type case with other metal materials may be prevented, and the outer side of the pouch type case may be passivated in a following process. Therefore, adverse influence in the subsequent process may be prevented.

The position of the polymer coating layer formed is not specifically limited. The polymer coating layer may be formed only on the outer side portion perpendicular to an extruded surface of the electrode terminals of an electrode assembly as shown in FIG. 1B, or may be selectively formed on the outer side portion horizontal to the extruded surface of the electrode terminals. Most preferably, the polymer coating layer may be formed on the entire outer side portion of the pouch type case as shown in FIG. 1A. In this case, the electrode terminals may include a cathode terminal and an anode terminal, and may be disposed on the same side of the electrode assembly and may be disposed on each of both sides facing to each other, respectively. For example, the electrode terminals may be disposed on one side of a battery cell, on both sides facing to each other so that the electrode terminals may not make electrical contact with each other.

In addition, in the pouch type secondary battery of the present invention, a polymer may include all kinds of polymer providing insulating properties after being coated and cured. The polymer may be a UV curable polymer or a thermosetting polymer, and is not limited thereto.

Particularly, the UV curable polymer may include a single material or a mixture selected from an organic isocyanate compound having two or more isocyanate groups and a hydroxyalkyl (meth)acrylate resin modified with a polylactone-based compound.

In addition, the thermosetting polymer may include a single material or a mixture of two or more selected from the group consisting of epoxyalkyl (meth)acrylate, allyl glycidyl ether, allyl glycidyl ester, aryl glycidyl ether, aryl glycidyl ester, glycidyl 5-norbornene-2-methyl-2-carboxylate (a mixture of endo- and exo-compounds), 1,2-epoxy-5-hexene, 1,2-epoxy-9-decene, glycidyl (meth)acrylate, glycidyl α-ethyl (meth)acrylate, glycidyl α-n-propyl (meth)acrylate, glycidyl α-n-butyl (meth)acrylate, methylglycidyl (meth)acrylate, 3,4-epoxybutyl (meth)acrylate, 4,5-epoxypentyl (meth)acrylate, 5,6-epoxyheptyl (meth)acrylate, and 6,7-epoxyheptyl α-ethylacrylate.

In addition, the thickness of the polymer coating layer 106 is not specifically limited and is formed to the smallest thickness only if restricting the permeation of water depending on the kind of the polymer forming the coating layer. The polymer coating layer 106 may be formed as thick as possible within the range of keeping the exterior standard of the pouch type secondary battery.

In addition, there is provided a method of manufacturing a pouch type secondary battery including preparing a pouch type case provided with a receiving part for receiving an electrode assembly and a gas collecting part connected to the receiving part for collecting gas generated in the receiving part; receiving the electrode assembly in the pouch type case; sealing an outer part of the pouch type case by heat welding; injecting an electrolyte in the pouch type case; activating a secondary battery and collecting gas generated during activating through the gas collecting part; heat welding a boundary of the receiving part and the gas collecting part; cutting and removing the gas collecting part; and forming a polymer coating layer on an outer side portion of the pouch type case receiving the electrode assembly, in the present invention.

In the method of the present invention, the forming of the polymer coating layer may be performed before or after a second battery formation process, and may preferably be performed after the second battery formation process.

In addition, the polymer coating layer may be formed by a contact type coating method.

The contact type coating method may be performed by using a sponge coating head or a roller coating head. Particularly, since the polymer coating layer of the present invention is coated after dissolving the polymer in water or in an organic solvent, the coating method is not specifically limited, and an appropriate method may be used.

In addition, after forming the polymer coating layer, a common heat drying process may be additionally performed for drying the coating layer.

Figure 2:
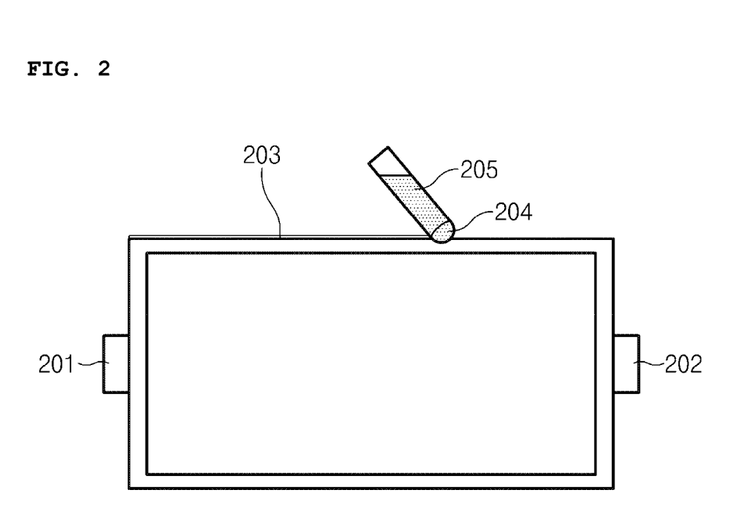
FIG. 2 is a schematic diagram showing a contact type coating method in a method of manufacturing a pouch type secondary battery according to an embodiment of the present invention.

FIG. 2 is a schematic diagram showing a contact type coating method in a method of manufacturing a pouch type secondary battery according to an embodiment of the present invention.

Referring to FIG. 2, after performing the degassing process, the gas collecting part is removed, and the second battery formation is performed. Then, a polymer coating layer 203 is formed on the entire surface of an exposed pouch type case.

In this case, the position of the polymer coating layer is not specifically limited, and the polymer coating layer may be formed only on the outer side portion perpendicular to extruded sides of electrode terminals 201 and 202, or may be selectively formed on the outer side portion horizontal to the extruded sides of the electrode terminals of an electrode assembly. However, the polymer coating layer may preferably be formed on the entire outer side portion of the pouch type case.

The polymer coating layer may be formed by using a contact type coating method.

That is, after contacting a coating apparatus provided with a coating head 204 and a vessel 205 containing a polymer material to the outer side portion of the pouch type case, coating may be performed along the outer side portion.

Figure 3A:
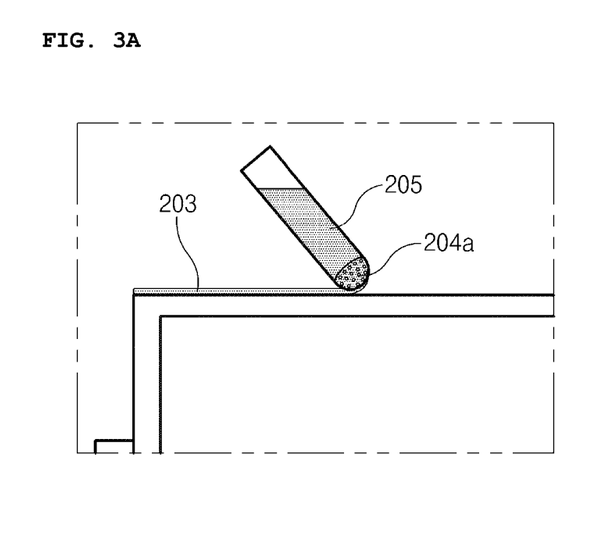
FIGS. 3A and 3B are schematic diagrams particularly showing the shape of a coating head in a method of manufacturing pouch type secondary batteries according to an embodiment of the present invention.
Figure 3B:
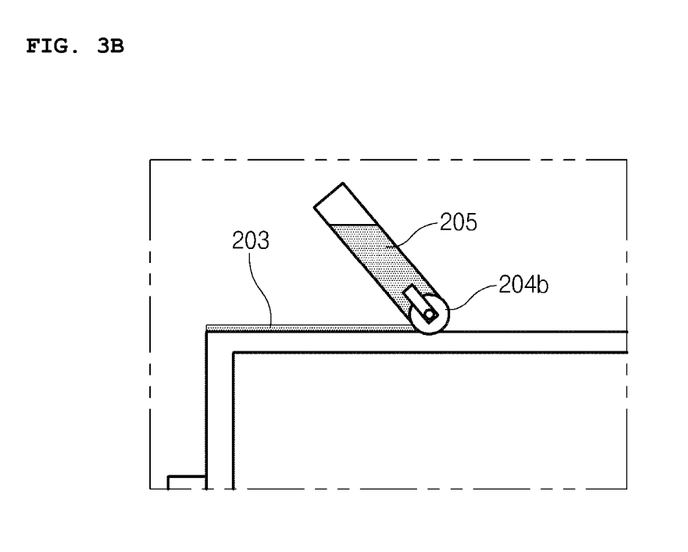

The coating head 204 of a contact type may be a sponge coating head 204a as shown in FIG. 3A or a roller coating head 204b of a fiber-based material as shown in FIG. 3B.

While the present invention has been shown and described in connection with the exemplary embodiments, it will be apparent to those skilled in the art that modifications and variations can be made without departing from the spirit and scope of the invention as defined by the appended claims.

EXPLANATION ON DESIGNATED SYMBOLS

100: upper sheet or lower sheet of the pouch type secondary battery
101: inner layer
102: adhesive layer
103: metal layer
104: corrosion preventing layer
105: outer layer
106, 203: polymer coating layer
201, 202: electrode terminal of the pouch type secondary battery
204: coating head
204a: sponge coating head
204b: roller coating head
205: vellse of coating material

What is claimed is:

1. A pouch type secondary battery, comprising:
a pouch type case formed by attaching an upper sheet and a lower sheet; and
an electrode assembly received in the pouch type case,
wherein each of the upper sheet and the lower sheet includes an inner layer, a metal layer, and an outer layer,
wherein a polymer coating layer for improving sealability is directly formed on only an entire outermost surface of the metal layer of the pouch type case that extends perpendicular to the inner layer and the outer layer, in which the upper sheet and the lower sheet are attached.

2. The pouch type secondary battery of claim 1, wherein the polymer is a UV curable polymer or a thermosetting polymer.

3. The pouch type secondary battery of claim 2, wherein the UV curable polymer includes at least one selected from the group consisting of an organic isocyanate compound having two or more isocyanate groups and a hydroxyalkyl (meth)acrylate resin modified with a polylactone-based compound.

4. The pouch type secondary battery of claim 2, wherein the thermosetting polymer includes at least one selected from the group consisting of epoxyalkyl (meth)acrylate, allyl glycidyl ether, allyl glycidyl ester, aryl glycidyl ether, aryl glycidyl ester, glycidyl 5-norbornene-2-methyl-2-carboxylate (a mixture of endo- and exo-compounds), 1,2-epoxy-5-hexene, 1,2-epoxy-9-decene, glycidyl (meth)acrylate, glycidyl α-ethyl (meth)acrylate, glycidyl α-n-propyl (meth)acrylate, glycidyl α-n-butyl (meth)acrylate, methylglycidyl (meth)acrylate, 3,4-epoxybutyl (meth)acrylate, 4,5-epoxypentyl (meth)acrylate, 5,6-epoxyheptyl (meth)acrylate, and 6,7-epoxyheptyl α-ethylacrylate.

5. The pouch type secondary battery of claim 1, wherein the polymer coating layer is formed on an outer side portion perpendicular to an extruded surface of an electrode terminal of the electrode assembly.

6. The pouch type secondary battery of claim 1, wherein the polymer coating layer is formed on an outer side portion horizontal to an extruded surface of an electrode terminal of the electrode assembly.

7. A method of manufacturing a pouch type secondary battery according to claim 1, comprising:
preparing a pouch type case provided with a receiving part for receiving an electrode assembly and a gas collecting part connected to the receiving part for collecting gas generated in the receiving part;
receiving the electrode assembly in the pouch type case;
sealing an outer part of the pouch type case by heat welding;
injecting an electrolyte in the pouch type case;
activating a secondary battery and collecting gas generated during activating through the gas collecting part;
heat welding a boundary of the receiving part and the gas collecting part;

cutting and removing the gas collecting part; and
forming a polymer coating layer on an outer side portion of the pouch type case receiving the electrode assembly.

8. The method of manufacturing a pouch type secondary battery of claim 7, wherein the forming of the polymer coating layer is performed by a contact type coating method.

9. The method of manufacturing a pouch type secondary battery of claim 8, wherein the contact type coating method is performed by using a sponge coating head or a roller coating head.

10. A pouch type secondary battery, comprising:
a pouch type case formed by attaching an upper sheet and a lower sheet, each of the upper sheet and the lower sheet having an inner layer, a metal layer above the inner layer, and an outer layer above the metal layer; and
an electrode assembly received in the pouch type case, the inner layers being adjacent electrode assembly,
wherein a polymer coating layer for improving sealability is directly formed on only an entire outermost surface of the metal layer of the pouch type case that extends perpendicular to the inner layer and the outer layer, in which the upper sheet and the lower sheet are attached.

11. The pouch type secondary battery of claim 10, wherein the polymer is a UV curable polymer or a thermosetting polymer.

12. The pouch type secondary battery of claim 11, wherein the UV curable polymer includes at least one selected from the group consisting of an organic isocyanate compound having two or more isocyanate groups and a hydroxyalkyl (meth)acrylate resin modified with a polylactone-based compound.

13. The pouch type secondary battery of claim 11, wherein the thermosetting polymer includes at least one selected from the group consisting of epoxyalkyl (meth)acrylate, allyl glycidyl ether, allyl glycidyl ester, aryl glycidyl ether, aryl glycidyl ester, glycidyl 5-norbornene-2-methyl-2-carboxylate (a mixture of endo- and exo-compounds), 1,2-epoxy-5-hexene, 1,2-epoxy-9-decene, glycidyl (meth)acrylate, glycidyl α-ethyl (meth)acrylate, glycidyl α-n-propyl (meth)acrylate, glycidyl α-n-butyl (meth)acrylate, methylglycidyl (meth)acrylate, 3,4-epoxybutyl (meth)acrylate, 4,5-epoxypentyl (meth)acrylate, 5,6-epoxyheptyl (meth)acrylate, and 6,7-epoxyheptyl α-ethyl-acrylate.

14. The pouch type secondary battery of claim 10, wherein the polymer coating layer is formed on an outer side portion perpendicular to an extruded surface of an electrode terminal of the electrode assembly.

15. The pouch type secondary battery of claim 10, wherein the polymer coating layer is formed on an outer side portion horizontal to an extruded surface of an electrode terminal of the electrode assembly.

* * * * *